(12) United States Patent
Akiyama (10) Patent No.: US 10,757,771 B2
(45) Date of Patent: Aug. 25, 2020

(54) POINTING ELEMENT, IMAGE PROJECTION SYSTEM, AND METHOD FOR CONTROLLING POINTING ELEMENT

(71) Applicant: SEIKO EPSON CORPORATION, Tokyo (JP)

(72) Inventor: Masanori Akiyama, Shimosuwa-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/363,030

(22) Filed: Mar. 25, 2019

(65) Prior Publication Data
US 2019/0297698 A1  Sep. 26, 2019

(30) Foreign Application Priority Data
Mar. 26, 2018  (JP) ................................. 2018-057645

(51) Int. Cl.
  *H05B 45/10*  (2020.01)
  *H02J 7/00*   (2006.01)
  *G06F 3/038*  (2013.01)
  *G06F 3/042*  (2006.01)
  *G06F 3/0354* (2013.01)

(52) U.S. Cl.
  CPC .............. *H05B 45/10* (2020.01); *G06F 3/038* (2013.01); *G06F 3/03542* (2013.01); *G06F 3/0425* (2013.01); *H02J 7/0063* (2013.01); *H02J 2007/0067* (2013.01)

(58) Field of Classification Search
CPC .. H05B 33/0854; G06F 3/038; G06F 3/03542
See application file for complete search history.

(56) References Cited

U.S. PATENT DOCUMENTS

| | | | |
|---|---|---|---|
| 6,639,585 B1 | 10/2003 | Nagai et al. | |
| 2009/0316392 A1* | 12/2009 | Chou | H02J 7/35 362/183 |
| 2012/0140090 A1* | 6/2012 | Sugino | H04N 5/23222 348/222.1 |
| 2013/0314514 A1* | 11/2013 | Mochinaga | H04N 13/178 348/54 |
| 2014/0111030 A1* | 4/2014 | Chou | G05F 1/10 307/130 |
| 2018/0039344 A1* | 2/2018 | Yamamoto | G06F 3/0428 |

FOREIGN PATENT DOCUMENTS

| | | |
|---|---|---|
| JP | 2001-134368 A | 5/2001 |
| JP | 2014-186087 A | 10/2014 |

\* cited by examiner

*Primary Examiner* — Amy Cohen Johnson
*Assistant Examiner* — Jianzi Chen
(74) *Attorney, Agent, or Firm* — Oliff PLC (57) ABSTRACT

A light pen which performs pointing on an image projected from a projector includes: a battery; a light emitting unit which intermittently emits light with electric power supplied from the battery; a remaining battery capacity detection unit which detects a remaining capacity of the battery; and a control unit which changes a light emission mode of the light emitting unit in such a way as to reduce an amount of light emitted from the light emitting unit, if the remaining capacity of the battery detected by the remaining battery capacity detection unit is equal to or lower than a predetermined threshold.

13 Claims, 6 Drawing Sheets

POINTING ELEMENT, IMAGE PROJECTION SYSTEM, AND METHOD FOR CONTROLLING POINTING ELEMENT

BACKGROUND

1. Technical Field

The present invention relates to a pointing element which performs pointing on an image projected from a projector, an image projection system having this pointing element, and a method for controlling a pointing element.

2. Related Art

An image projection system which can detect a position pointed by a pointing element such as an electronic pen is known (see, for example, JP-A-2014-186087). The image projection system (projector system) disclosed in JP-A-2014-186087 includes a projector and an electronic pen and has a measure for reporting to the user that the remaining capacity of the battery of the electronic pen has become low, if that happens.

However, if the battery cannot be immediately replaced after a low remaining battery capacity is detected, the battery depletion continues and may prevent the electronic pen from functioning even when in use. Therefore, a technique for restraining the battery depletion to enable continued use of the electronic pen until the battery is replaced after a low remaining battery capacity is detected is desired.

SUMMARY

A pointing element according to an aspect of the invention performs pointing on an image projected from a projector and includes: a battery; a light emitting unit which intermittently emits light with electric power supplied from the battery; a remaining battery capacity detection unit which detects a remaining capacity of the battery; and a control unit which changes a light emission form of the light emitting unit in such a way as to reduce an amount of light emitted from the light emitting unit, if the remaining capacity of the battery detected by the remaining battery capacity detection unit is equal to or lower than a predetermined threshold.

In the pointing element, it is desirable that the control unit reduces a light emission time of the light emitting unit in a predetermined period, if the remaining capacity of the battery detected by the remaining battery capacity detection unit is equal to or lower than the predetermined threshold.

In the pointing element, it is desirable that the control unit reduces a number of times the light emitting unit emits light in a predetermined period, if the remaining capacity of the battery detected by the remaining battery capacity detection unit is equal to or lower than the predetermined threshold.

In the pointing element, it is desirable that the control unit reduces a light emission intensity of the light emitting unit, if the remaining capacity of the battery detected by the remaining battery capacity detection unit is equal to or lower than the predetermined threshold.

It is desirable that the pointing element further includes a reporting unit which reports that the light emission form of the light emitting unit is changed, if that happens.

It is desirable that the pointing element further includes a notification unit which notifies the projector of a timing of changing the light emission form of the light emitting unit.

An image projection system according to another aspect of the invention includes a projector and a pointing element which performs pointing on an image projected from the projector. The pointing element includes: a battery; a light emitting unit which intermittently emits light with electric power supplied from the battery; a remaining battery capacity detection unit which detects a remaining capacity of the battery; and a control unit which changes a light emission form of the light emitting unit in such a way as to reduce an amount of light emitted from the light emitting unit, if the remaining capacity of the battery detected by the remaining battery capacity detection unit is equal to or lower than a predetermined threshold.

A method for controlling a pointing element according to still another aspect of the invention is a method for controlling a pointing element which has a battery and a light emitting unit and which performs pointing on an image projected from a projector. The method includes: causing the light emitting unit to intermittently emit light with electric power supplied from the battery; detecting a remaining capacity of the battery; and changing a light emission form of the light emitting unit in such a way as to reduce an amount of light emitted from the light emitting unit, if the detected remaining capacity of the battery is equal to or lower than a predetermined threshold.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
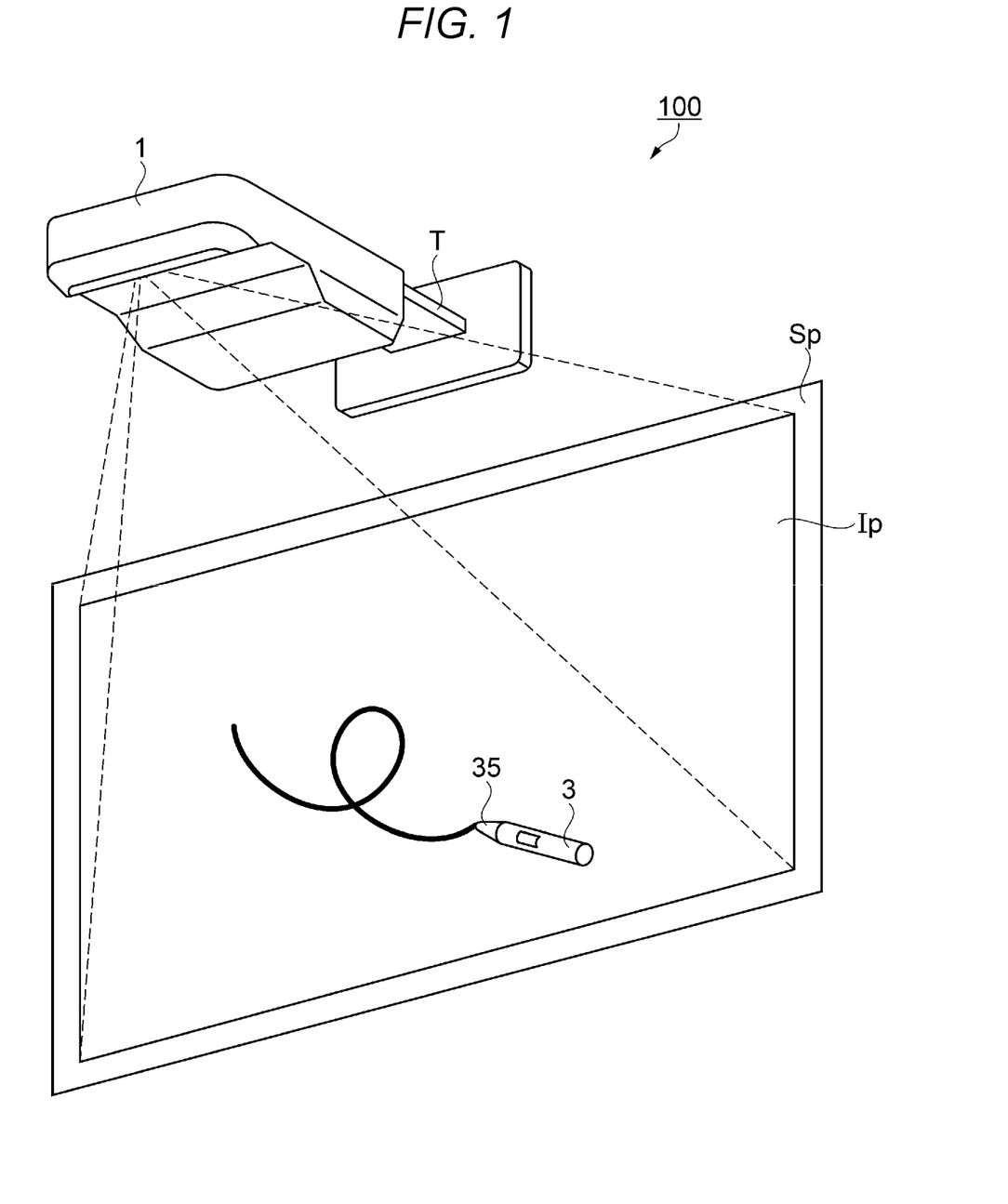
FIG. 1 is a perspective view showing an image projection system.

Hereinafter, an image projection system according to this embodiment will be described with reference to the drawings. FIG. 1 is a perspective view showing an image projection system 100 according to this embodiment.

As shown in FIG. 1, the image projection system 100 has a projector 1, and a light pen 3 as a pointing element. The projector 1 projects an image based on image information inputted from outside or image information stored inside in advance, onto a projection surface Sp as a display surface. The projector 1 in this embodiment is fixed to a wall surface via a fastening member T and projects an image toward the projection surface Sp arranged along the same wall surface. The projection surface Sp can be, for example, a screen, whiteboard or the like. However, an image may be projected on the wall surface itself.

The projector 1 can also pick up an image over a range including an image (hereinafter referred to as a "projection image Ip") projected on the projection surface Sp. The projector 1 picks up an image of infrared light emitted from a light emitting unit 35 at the distal end of the light pen 3 and detects a position (pointed position) pointed by the light pen 3 within the projection image Ip, based on the position of the light. The projector 1 can then display a pointer as superimposed at the detected pointed position, or can display an image such as a line drawn along the trajectory of the pointed position (hereinafter also referred to as a "drawn image") as superimposed thereon. While the light pen 3 emits infrared light in this embodiment, the light pen 3 may emit light in other wavelength ranges.

Figure 2:
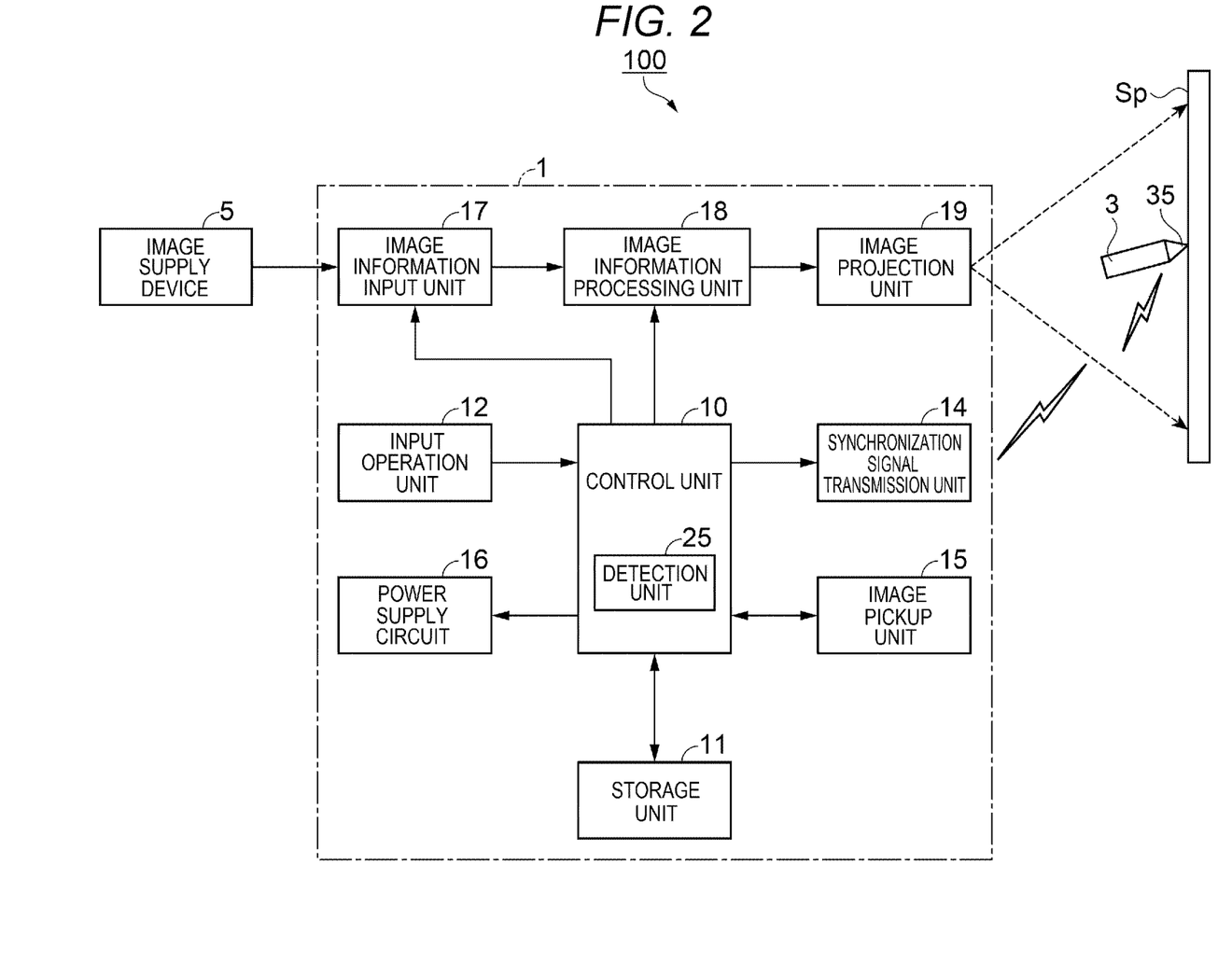
FIG. 2 is a block diagram showing a schematic configuration of a projector.
Figure 3:
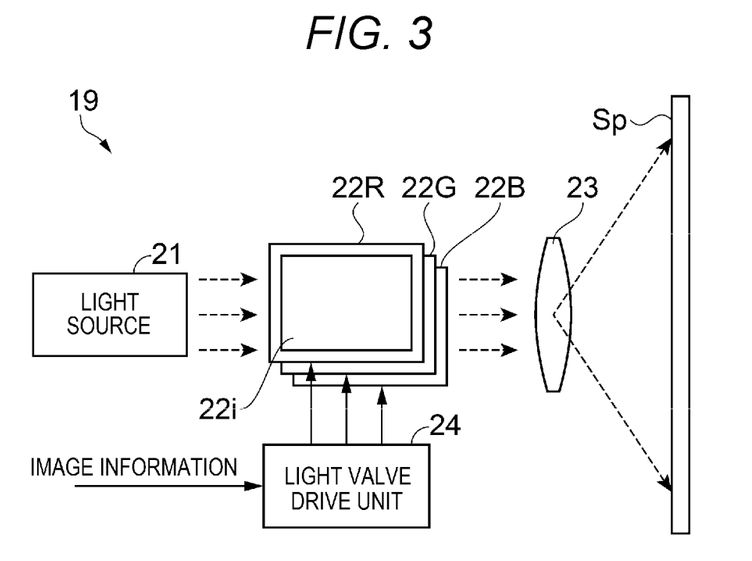
FIG. 3 is a block diagram showing a schematic configuration of an image projection unit.

FIG. 2 is a block diagram showing a schematic configuration of the projector 1. FIG. 3 is a block diagram showing a schematic configuration of an image projection unit 19 of the projector 1.

As shown in FIG. 2, the projector 1 has a control unit 10, a storage unit 11, an input operation unit 12, a synchronization signal transmission unit 14, an image pickup unit 15, a power supply circuit 16, an image information input unit 17, an image information processing unit 18, and an image projection unit 19 as a display unit, which are provided in a unified manner. The projector 1 projects an image onto the projection surface Sp from the image projection unit 19, based on image information inputted to the image information input unit 17.

The control unit 10 has one or a plurality of processors and operates according to a control program stored in the storage unit 11, thus comprehensively controlling operations of the projector 1.

The storage unit 11 has a memory such as a RAM (random access memory) and a ROM (read-only memory). The RAM is used to temporarily store various data or the like. The ROM stores the control program and control data or the like to control operations of the projector 1. The storage unit 11 may also store image information to be projected from the image projection unit 19.

The input operation unit 12 has a plurality of operation keys for a user to give various instructions to the projector 1. The operation keys provided on the input operation unit 12 include a "power key" to switch the power between on and off (standby), a "menu key" to display a menu image for various settings, a "direction key" to select an item on the menu image, and the like. As the user operates the various operation keys on the input operation unit 12, the input operation unit 12 outputs an operation signal corresponding to the content of the operation by the user, to the control unit 10. Also, a remote controller (not illustrated) capable of remote control may be used as the input operation unit 12. In this case, the remote controller transmits an operation signal of infrared light corresponding to the content of the operation by the user, and a remote control signal receiving unit, not illustrated, receives this operation signal and transmits the operation signal to the control unit 10.

The synchronization signal transmission unit 14 has a light emitting unit to transmit a signal for synchronization (synchronization signal) to the light pen 3. As the light source of the light emitting unit, for example, an LED (light emitting diode) which emits infrared light is used. The synchronization signal transmission unit 14 causes the light emitting unit to periodically emit light under the control of the control unit 10 and transmits a synchronization signal of infrared light to the light pen 3. The light pen 3 periodically receives this synchronization signal and causes the light emitting unit 35 to repeatedly emit light at a timing synchronized with the received synchronization signal.

The image pickup unit 15 is a camera having an image pickup element (not illustrated) such as a CCD (charge-coupled device) sensor or a CMOS (complementary metal-oxide semiconductor) sensor. The image pickup unit 15 has an infrared transmission filter which absorbs visible light and transmits infrared light. The image pickup unit 15 picks up an image of infrared light emitted from the light pen 3, via this infrared transmission filter. The image pickup unit 15 picks up an image over a range including the projection image Ip on the projection surface Sp under the control of the control unit 10 and outputs image information (picked-up image information), which is the result of the image pickup, to the control unit 10. The control unit 10 causes the image pickup unit 15 to pick up an image at a timing synchronized with the synchronization signal transmitted from the synchronization signal transmission unit 14. That is, the image pickup unit 15 repeats image pickup in accordance with the timing when the light pen 3 emits light.

The control unit 10 of the projector 1 has a detection unit 25 as a functional block implemented by the control program. The detection unit 25 detects the infrared light emitted from the light pen 3, from the picked-up image, based on the picked-up image information inputted from the image pickup unit 15. The detection unit 25 regards an image with a brightness equal to or higher than a predetermined threshold and with a size equal to or greater than a predetermined threshold, of the image of infrared light included in the picked-up image, as the light emitted from the light pen 3, and therefore detects this image. The detection unit 25 regards other images as a noise and therefore does not detect the other images.

The power supply circuit 16 is supplied with mains electricity (not illustrated) of AC 100 V or the like from outside. The power supply circuit 16 converts mains electricity (AC power supply) to a DC power supply of a predetermined voltage and supplies electric power to each part of the projector 1 (the supply route to each part is not illustrated). The control unit 10 can control the power supply circuit 16 to start and stop supplying electric power to each part.

The image information input unit 17 is connected to an external image supply device 5 such as a computer or image playback device and receives image information supplied from the image supply device 5. The image information input unit 17 can also be supplied with image information stored in the storage unit 11, from the control unit 10. The image information input unit 17 outputs the inputted image information to the image information processing unit 18.

The image information processing unit 18, under the control of the control unit 10, performs various kinds of processing on the image information inputted from the image information input unit 17 and outputs the processed image information to a light valve drive unit 24 (see FIG. 3) of the image projection unit 19. For example, the image information processing unit 18 performs, on the image information, processing to adjust image quality such as brightness and contrast, processing to corrects a distortion of the image, processing to superimpose an OSD (on-screen display) image such as a pointer, drawn image, or menu image, and the like, according to need.

The image information input unit 17 and the image information processing unit 18 may be made up of one or a plurality of processors or the like, or may be made up of a dedicated processing device such as an ASIC (application-specific integrated circuit) or FPGA (field-programmable gate array).

As shown in FIG. 3, the image projection unit 19 has a light source 21, three liquid crystal light valves 22R, 22G, 22B as light modulation devices, a projection system 23, and a light valve drive unit 24 or the like. In the image projection unit 19, the liquid crystal light valves 22R, 22G, 22B modulate light emitted from the light source 21 and thus form image light, and the projection system 23 including at least one of a lens and a mirror projects the image light to display an image on the projection surface Sp.

The light source 21 includes a discharge-type light source lamp such as an ultra-high-pressure mercury lamp or metal halide lamp, or a solid-state light source such as a light-emitting diode or semiconductor laser. The light emitted from the light source 21 is converted into light with substantially uniform luminance distribution by an optical integration system, not illustrated. The light is then separated into individual color light components of red (R), green (G), and blue (B) by a color separation system, not illustrated. The individual color light components become incident on the corresponding liquid crystal light valves 22R, 22G, 22B.

Each of the liquid crystal light valves 22R, 22G, 22B is made up of a transmission-type liquid crystal panel having a pair of transparent substrates with a liquid crystal enclosed between them. On each liquid crystal panel, a rectangular image forming area 22i made up of a plurality of pixels arranged into a matrix is formed. A drive voltage can be applied to the liquid crystal at each pixel.

The light valve drive unit 24 forms an image in the image forming area 22i of the liquid crystal light valves 22R, 22G, 22B. Specifically, the light valve drive unit 24 applies a drive voltage corresponding to image information inputted from the image information processing unit 18, to each pixel in the image forming area 22i, and thus sets each pixel to a light transmittance corresponding to the image information. The light emitted from the light source 21 is transmitted through the image forming area 22i of the liquid crystal light valves 22R, 22G, 22B and thus modulated at each pixel. Image light corresponding to the image information is thus formed for each color light component. The resulting image lights of the individual colors are combined at each pixel by a light combining system, not illustrated, and thus form image light representing a color image. The image light is then projected in an enlarged manner on the projection surface Sp by the projection system 23. Consequently, an image based on the image information inputted to the image information input unit 17 is displayed on the projection surface Sp.

Figure 4:
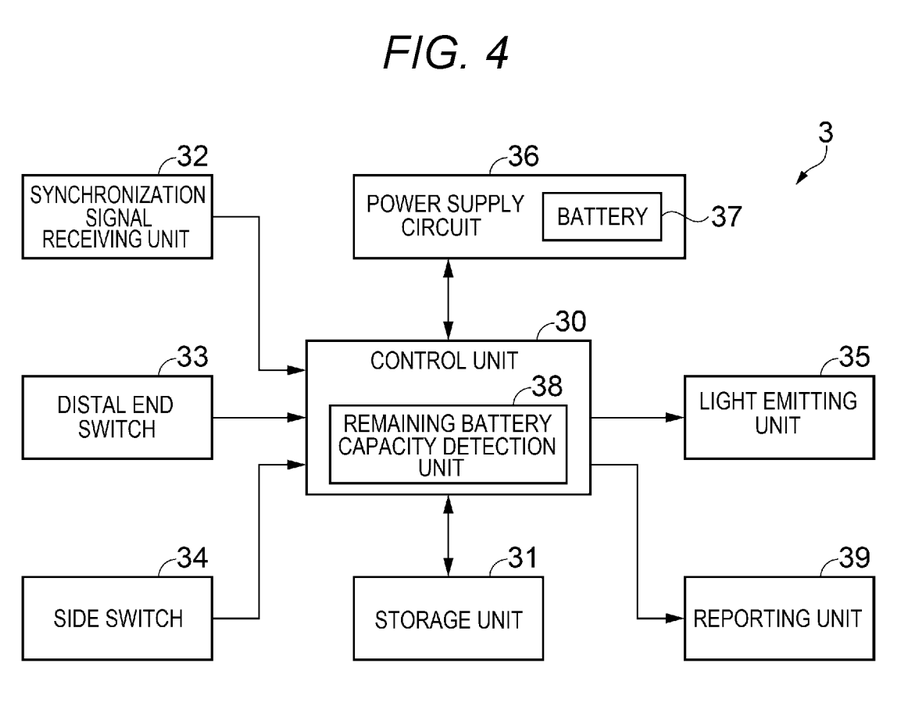
FIG. 4 is a block diagram showing a schematic configuration of a light pen.

FIG. 4 is a block diagram showing a schematic configuration of the light pen 3.

As shown in FIG. 4, the light pen 3 has a control unit 30, a storage unit 31, a synchronization signal receiving unit 32, a distal end switch 33, a side switch 34, a light emitting unit 35, a power supply circuit 36, and a reporting unit 39. The power supply circuit 36 includes a battery 37.

The control unit 30 has one or a plurality of processors. The control unit 30 operates according to a control program stored in the storage unit 31 and thus comprehensively controls operations of the light pen 3.

The storage unit 31 is made up of a memory which stores the control program and control data or the like for controlling operations of the light pen 3.

The synchronization signal receiving unit 32 is made up of a light receiving element or the like which receives infrared light. The synchronization signal receiving unit 32 receives a synchronization signal of infrared light transmitted periodically from the synchronization signal transmission unit 14 of the projector 1, converts the synchronization signal into an electrical signal, and outputs the electrical signal to the control unit 30.

The distal end switch 33 is arranged at a distal end part (tip) of the light pen 3. When an operation of pressing the distal end part against the projection surface Sp is carried out or the like, the distal end switch 33 detects the press on the distal end part and outputs the result of the detection to the control unit 30.

The side switch 34 detects an operation (press) by the user on an operation button arranged on the lateral side of the light pen 3 and outputs the result of the detection to the control unit 30.

The light emitting unit 35 has a light source (for example, LED) arranged near the distal end part of the light pen 3 and emits infrared light under the control of the control unit 30. The control unit 30 causes the light emitting unit 35 to emit light periodically, that is, intermittently, in synchronization with the synchronization signal received periodically by the synchronization signal receiving unit 32.

The power supply circuit 36 has the battery 37. The power supply circuit 36 converts DC power supplied from the battery 37 into a predetermined voltage and supplies electric power to each part of the light pen 3 (the supply route to each part is not illustrated). The control unit 30 can control the power supply circuit 36 to start and stop supplying electric power to each part. The light emitting unit 35 emits light with electric power supplied from the power supply circuit 36 (battery 37). The power supply circuit 36 also constantly measures the output voltage of the battery 37 and outputs the result of the measurement to the control unit 30.

The battery 37 is, for example, a primary battery accommodated in a replaceable manner and supplies electric power to the power supply circuit 36. Also, a rechargeable secondary battery may be employed as the battery 37.

The control unit 30 of the light pen 3 has a remaining battery capacity detection unit 38 as a functional block implemented by the control program. The remaining battery capacity detection unit 38 detects the remaining capacity (hereinafter also referred to as a "remaining battery capacity") of the battery 37, based on the result of measuring the output voltage of the battery 37 inputted from the power supply circuit 36. The control unit 30 decides a form of light emission (hereinafter also referred to as a "light emission mode" or "light emission form") of the light emitting unit 35, based on the remaining battery capacity detected by the remaining battery capacity detection unit 38, and causes the light emitting unit 35 to emit light in the light emission mode thus decided. Specifically, based on the remaining battery capacity, the control unit 30 changes the light emission time of each round of light emission by the light emitting unit 35 emitting light intermittently, the number of times the light emitting unit 35 emits light in a predetermined period, and the light emission intensity or the like.

The reporting unit 39 is an indicator having one or a plurality of light sources (for example, LED) emitting visible light. The reporting unit 39 emits light under the control of the control unit 30. The control unit 30 changes the color of emitted light or the light emission state (switched off, flashing on and off, or switched on) of the reporting unit 39 according to the light emission mode of the light emitting unit 35 and thus reports to the user that the light emission mode is changed, or the current light emission mode.

Figure 5:
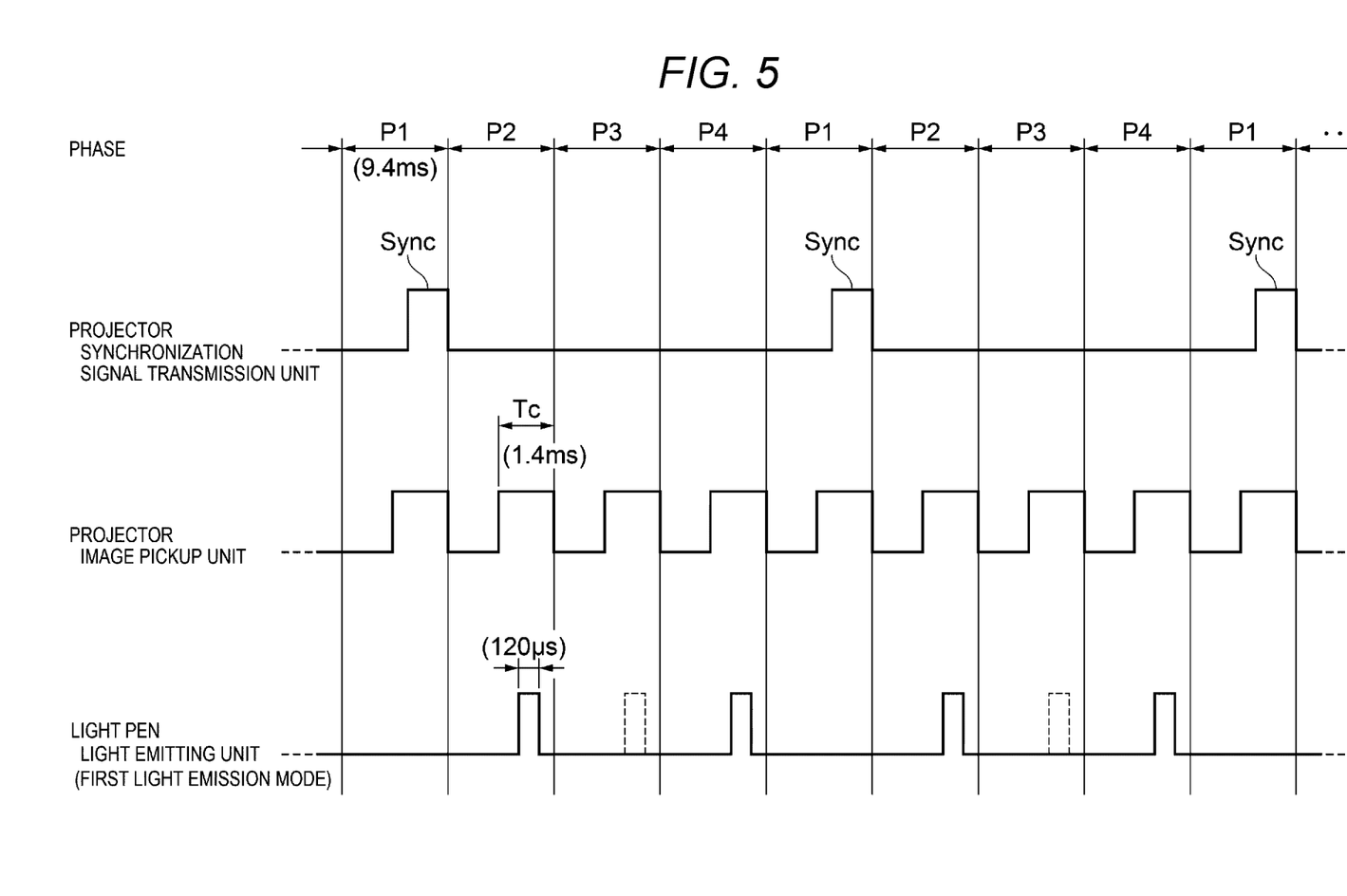
FIG. 5 is a timing chart showing operation timings of the image projection system.

FIG. 5 is a timing chart showing operation timings of the image projection system 100 and showing, from the top, the timing when the synchronization signal transmission unit 14 of the projector 1 transmits a synchronization signal Sync (emits light), the timing when the image pickup unit 15 of the projector 1 performs image pickup, and the timing when the light emitting unit 35 of the light pen 3 emits light. In FIG. 5, the horizontal axis is the time axis, and the vertical axis represents each operation state.

As shown in FIG. 5, the image pickup unit 15 of the projector 1 repeats image pickup on a predetermined cycle (for example, on a cycle of about 9.4 milliseconds). If the cycle of image pickup is called a "phase", the projector 1 and the light pen 3 repeat similar operations every reference period made up of four phases, that is, a first phase P1, a second phase P2, a third phase P3, and a fourth phase P4.

The first phase P1 is a phase for synchronization. In the first phase P1, the synchronization signal transmission unit 14 of the projector 1 transmits the synchronization signal Sync to the light pen 3. The synchronization signal Sync is transmitted with a light emission intensity that can be received by the light pen 3 over the entire range of the projection image Ip. The image pickup unit 15 of the projector 1 performs image pickup during a predetermined image pickup period Tc in each of the phases P1 to P4, synchronously with the synchronization signal Sync. The image pickup period Tc (exposure time) of the image pickup unit 15 in each of the phases P1 to P4 is, for example, a period of approximately 1.4 milliseconds.

The synchronization signal receiving unit 32 of the light pen 3 receives the synchronization signal Sync in the first phase P1. The control unit 30 of the light pen 3 causes the light emitting unit 35 to emit light at the timing synchronized with the received synchronization signal Sync. Specifically, the control unit 30 causes the light emitting unit 35 to emit light with a square wave during the image pickup period Tc of the image pickup unit 15 so that the image pickup unit 15 picks up an image of the light emitted from the light emitting unit 35. More specifically, the control unit 30 causes the light emitting unit 35 to emit light with a predetermined light emission intensity during a period (light emission time) of 120 microseconds included in the image pickup period Tc. The control unit 30 causes the light emitting unit 35 to emit light in an amount of light that can be picked up with a sufficient brightness by the image pickup unit 15 of the projector 1 and that can be properly detected by the detection unit 25, no matter which position in the projection image Ip the light emitting unit 35 emits light. The amount of light emitted from the light emitting unit 35 during the image pickup period Tc is decided by the light emission intensity and the light emission time.

The control unit 30 of the light pen 3 causes the light emitting unit 35 to emit light twice or three times within one reference period. Specifically, during the image pickup period Tc in the second phase P2 and the fourth phase P4, of the four phases P1 to P4, the control unit 30 causes the light emitting unit 35 to emit light without exception. During the image pickup period Tc in the third phase P3, the control unit 30 causes the light emitting unit 35 to emit light or not to emit light, based on the state of the distal end switch 33 and the side switch 34 (whether the switch is pressed or not). The control unit 30 notifies the projector 1 of the state of the distal end switch 33 and the state of the side switch 34, based on the transition of the light emission state (hereinafter referred to as a "light emission sequence") of the light emitting unit 35 in the third phase P3 over a plurality of reference periods. An image of the light emitted from the light emitting unit 35 of the light pen 3 during the image pickup period Tc is picked up by the image pickup unit 15 of the projector 1. The light emission mode in which the light emitting unit 35 emits light in the foregoing form is called a "normal light emission mode" or "first light emission mode". Other than operating in the normal light emission mode, the light pen 3 can also operate in a power-saving light emission mode with lower power consumption than in the normal light emission mode. Details of the power-saving light emission mode will be described later.

The detection unit 25 of the projector 1 detects the position (pointed position) of the light pen 3, based on the position of the infrared light whose image is picked up in the second phase P2 and the fourth phase P4. The detection unit 25 also recognizes the state of the distal end switch 33 and the side switch 34 of the light pen 3, based on the light emission sequence of the infrared light whose image is picked up in the third phase P3. The detection unit 25 controls the image information processing unit 18, based on the pointed position of the light pen 3 and the state of the switches 33, 34 thus detected, and causes the image information processing unit 18 to perform processing to superimpose a pointer or drawn image, or the like.

Next, operations of the light pen 3 according to change in the remaining battery capacity will be described.

As the remaining capacity of the battery 37 drops with the use of the light pen 3, the control unit 30 of the light pen 3 changes the light emission mode of the light emitting unit 35 to the power-saving light emission mode and thus reduces the amount of light emitted from the light emitting unit 35, thus restraining the depletion of the battery 37.

Figure 6:
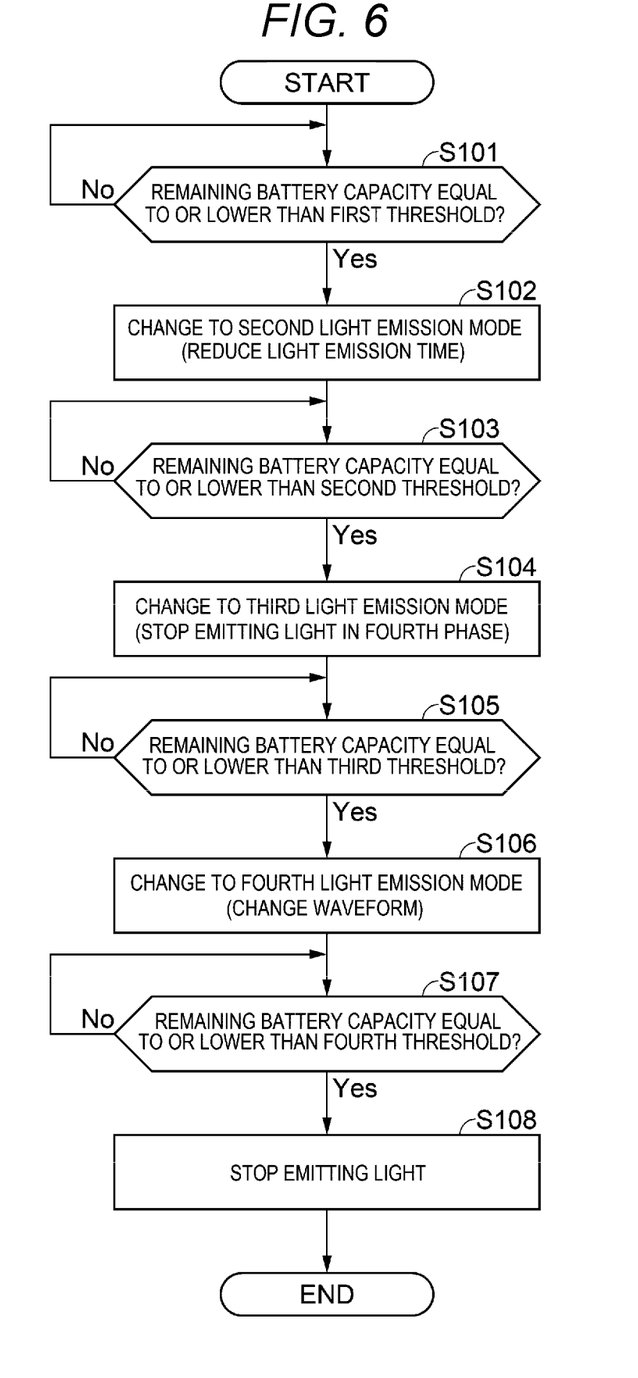
FIG. 6 is a flowchart for explaining operations of the light pen.
Figure 7:
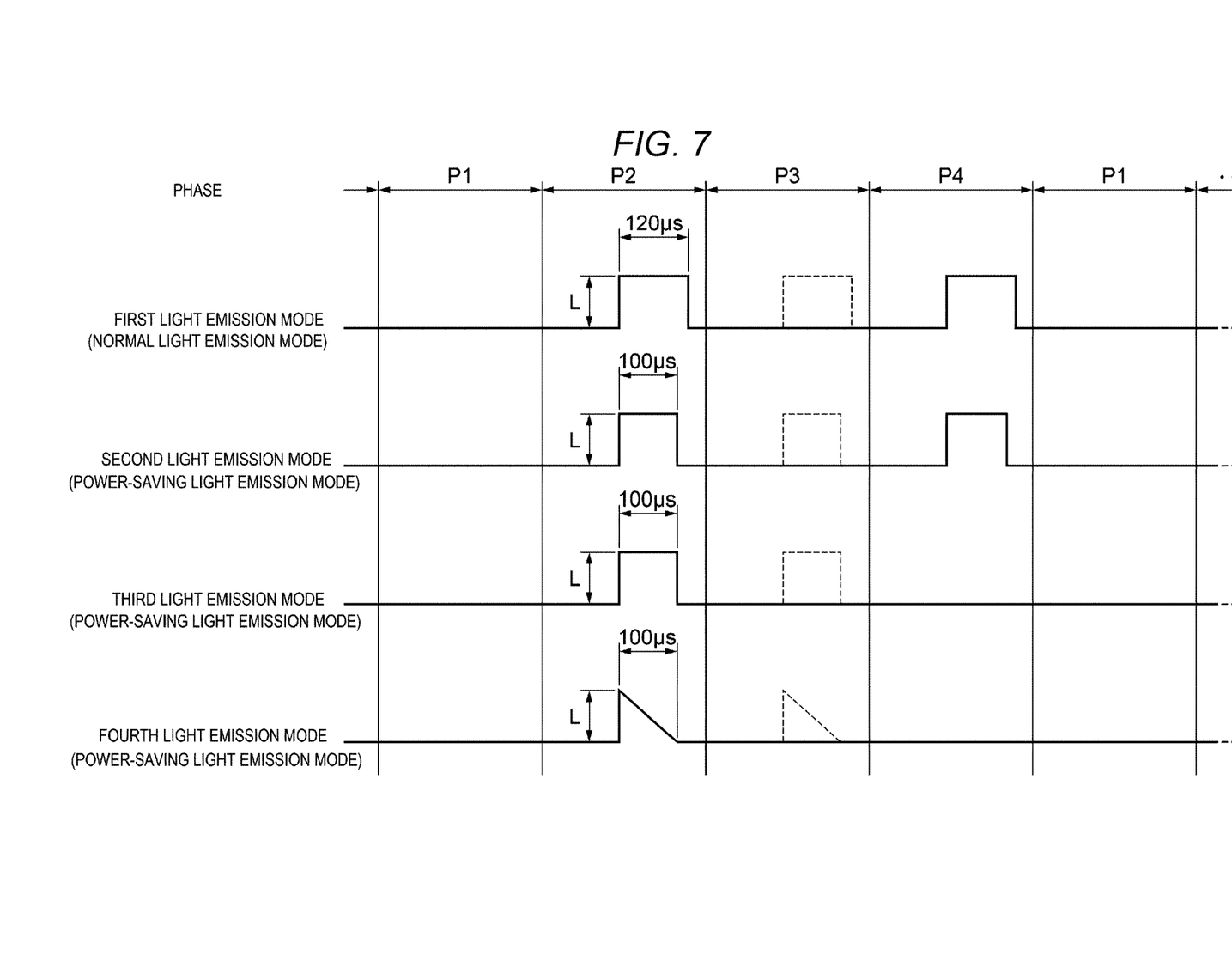
FIG. 7 is a timing chart for explaining each light emission mode.

FIG. 6 is a flowchart for explaining operations of the light pen 3. FIG. 7 is a timing chart for explaining each light emission mode.

A the battery 37 is loaded in the light pen 3 and the power is turned on, the control unit 30 of the light pen 3 starts operating according to the flow shown in FIG. 6. Subsequently, the control unit 30 causes the light emitting unit 35 to emit light repeatedly in the first light emission mode (normal light emission mode), synchronously with the synchronization signal Sync received by the synchronization signal receiving unit 32. In FIG. 6, which explains a flow for changing the light emission mode according to a drop in the remaining battery capacity, the step of receiving the synchronization signal Sync and the step of causing the light emitting unit 35 to emit light according to the synchronization signal Sync, or the like, are not illustrated. In FIG. 7, the horizontal axis is the time axis, and the vertical axis represents the light emission intensity of the light emitting unit 35.

As shown in FIG. 6, in step S101, the control unit 30 determines whether or not the remaining battery capacity detected by the remaining battery capacity detection unit 38 is equal to or lower than a first threshold. Four thresholds (first to fourth thresholds) for determining whether the remaining battery capacity is high or low are stored in the storage unit 31 of the light pen 3. The control unit 30 compares the detected remaining battery capacity with the first threshold, which is the highest value of the four thresholds. If the remaining battery capacity is equal to or lower than the first threshold, the control unit 30 shifts the processing to step S102. If the remaining battery capacity is higher than the first threshold, the control unit 30 repeats step S101.

If the remaining battery capacity is equal to or lower than the first threshold and the processing shifts to step S102, the control unit 30 changes the light emission mode of the light emitting unit 35 from the first light emission mode to a second light emission mode. The second light emission mode is one of the power-saving light emission modes. In the second light emission mode, the control unit 30 reduces the light emission time per round of the light emitting unit 35, that is, the light emission time in the image pickup period Tc. For example, the control unit 30 reduces the light emission time per round from 120 microseconds in the first light emission mode to 100 microseconds (see FIG. 7). This reduces the cumulative light emission time in the reference period. The light emission intensity of the light emitting unit 35 is the same value L as in the first light emission mode.

The control unit 30 also controls the reporting unit 39 to report to the user that the light emission mode of the light pen 3 is changed to the second light emission mode.

As the second light emission mode is set and the light emission time is reduced, the amount of light emitted from the light emitting unit 35 in the image pickup period Tc is reduced accordingly and the power consumption by the light pen 3 is restrained. However, since the infrared light whose image is picked up by the image pickup unit 15 of the projector 1 becomes slightly dimmer, if the light pen 3 is at a distant position from the projector 1, the light may not be properly detected by the projector 1 due to an insufficient amount of light. Thus, in the second light emission mode, it is desirable that the user avoids using the light pen 3 at the most distant position from the projector 1 (for example, the two corner parts on the far side from the projector 1, of the four corner parts (corners) of the projection image Ip).

Next, in step S103, the control unit 30 determines whether or not the remaining battery capacity detected by the remaining battery capacity detection unit 38 is equal to or lower than a second threshold which is smaller than the first threshold. If the remaining battery capacity is equal to or lower than the second threshold, the control unit 30 shifts the processing to step S104. If the remaining battery capacity is higher than the second threshold, the control unit 30 repeats step S103.

If the remaining battery capacity is equal to or lower than the second threshold and the processing shifts to step S104, the control unit 30 changes the light emission mode of the light emitting unit 35 from the second light emission mode to a third light emission mode. The third light emission mode, too, is one of the power-saving light emission modes. In the third light emission mode, the control unit 30 stops the light emitting unit 35 from emitting light in the fourth phase P4 and thus reduces the number of times the light emitting unit 35 emits light during the reference period. That is, while the control unit 30 causes the light emitting unit 35 to emit light without exception in the second phase P2 and causes the light emitting unit 35 to emit light according to the state of the distal end switch 33 and the side switch 34 in the third phase P3, the control unit 30 does not cause the light emitting unit 35 to emit light in the fourth phase P4 (see FIG. 7). As the light emission time of the light emitting unit 35 in the second phase P2 and the third phase P3, the control unit 30 maintains the same light emission time of 100 microseconds as in the second light emission mode. As the light emission intensity of the light emitting unit 35, the control unit 30 maintains the same value L as in the first and second light emission modes. The control unit 30 also controls the reporting unit 39 to report to the user that the light emission mode of the light pen 3 is changed to the third light emission mode.

As the light emitting unit 35 stops emitting light in the fourth phase P4, the number of times the light emitting unit 35 emits light during the reference period is reduced and therefore the amount of light emitted from the light emitting unit 35 per reference period is reduced accordingly. Thus, the power consumption by the light pen 3 is restrained further. However, since the frequency of detecting the pointed position is halved, the update interval of the pointer or drawn image displayed at the pointed position becomes longer and therefore the pointer or drawn image tends to follow the pointed position more slowly. Thus, in the third light emission mode, it is desirable that the user moves the light pen 3 slowly when pointing with the light pen 3. Reducing the number of times the light emitting unit 35 emits light during the reference period is equivalent to reducing the cumulative light emission time during the reference period.

Next, in step S105, the control unit 30 determines whether or not the remaining battery capacity detected by the remaining battery capacity detection unit 38 is equal to or lower than a third threshold which is smaller than the second threshold. If the remaining battery capacity is equal to or lower than the third threshold, the control unit 30 shifts the processing to step S106. If the remaining battery capacity is higher than the third threshold, the control unit 30 repeats step S105.

If the remaining battery capacity is equal to or lower than the third threshold and the processing shifts to step S106, the control unit 30 changes the light emission mode of the light emitting unit 35 from the third light emission mode to a fourth light emission mode. The fourth light emission mode, too, is one of the power-saving light emission modes. In the fourth light emission mode, the control unit 30 changes the waveform of the emitted light in the second phase P2 and the third phase P3 from rectangle wave to triangle wave. Specifically, up to the rise-up of light emission, the control unit 30 causes the light emitting unit 35 to emit light with the same light emission intensity value L as in the previous light emission but reduces the light emission intensity with the lapse of time (see FIG. 7). In the fourth phase P4, the control unit 30 does not cause the light emitting unit 35 to emit light, as in the third light emission mode. As the light emission time of the light emitting unit 35 in the second phase P2 and the third phase P3, the control unit 30 maintains the same light emission time of 100 microseconds as in the second and third light emission modes.

The control unit 30 also controls the reporting unit 39 to report to the user that the light emission mode of the light pen 3 is changed to the fourth light emission mode.

As the fourth light emission mode is set and the waveform of the emitted light becomes the triangle wave, the amount of light emitted from the light emitting unit 35 is reduced by the amount of the reduction in the light emission intensity and the power consumption by the light pen 3 is restrained further. However, since the infrared light whose image is picked up by the image pickup unit 15 of the projector 1 becomes even dimmer, if the light pen 3 is at a distant position from the projector 1, the light is less likely to be properly detected by the projector 1 due to an insufficient amount of light. Thus, in the fourth light emission mode, it is desirable that the user only uses the light pen 3 near the projector 1.

Next, in step S107, the control unit 30 determines whether or not the remaining battery capacity detected by the remaining battery capacity detection unit 38 is equal to or lower than a fourth threshold which is smaller than the third threshold. If the remaining battery capacity is equal to or lower than the fourth threshold, the control unit 30 shifts the processing to step S108. If the remaining battery capacity is higher than the fourth threshold, the control unit 30 repeats step S107. The fourth threshold is a value close to a lower limit of the remaining battery capacity with which operations of the light pen 3 can be maintained.

If the remaining battery capacity is equal to or lower than the fourth threshold and the processing shifts to step S108, the control unit 30 stops the light emitting unit 35 from emitting light from then on. The control unit 30 controls the reporting unit 39 to report to the user that the light pen 3 is not disabled. The control unit 30 then ends the flow.

As described above, the image projection system 100, the light pen 3, and the method for controlling these according to this embodiment can achieve the following effects.

(1) In this embodiment, the control unit 30 of the light pen 3 changes the light emission mode and reduces the amount of light emitted from the light emitting unit 35, if the remaining capacity of the battery 37 drops and becomes equal to or lower than a predetermined threshold. Thus, the depletion of the battery 37 is restrained and the time during which the light pen 3 can be used can be extended.

(2) In this embodiment, when changing the light emission mode from the first light emission mode to the second light emission mode, the control unit 30 reduces the light emission time of the light emitting unit 35 in the image pickup period Tc. Thus, the amount of light emitted from the light emitting unit 35 can be reduced by the amount of reduction in the light emission time.

(3) In this embodiment, when changing the light emission mode from the second light emission mode to the third light emission mode, the control unit 30 reduces the number of times the light emitting unit 35 emits light during the reference period. Thus, the amount of light emitted from the light emitting unit 35 can be reduced by the amount of reduction in the number of times of light emission.

(4) In this embodiment, when changing the light emission mode from the third light emission mode to the fourth light emission mode, the control unit 30 changes the waveform of the emitted light from square wave to triangle wave and thus reduces the light emission intensity. Thus, the amount of light emitted from the light emitting unit 35 can be reduced by the amount of reduction in the light emission intensity.

(5) In the embodiment, the light pen 3 has the reporting unit 39. Thus, it is possible to report to the user that the light emission mode is changed.

Modifications

The embodiment may be modified as follows.

In the embodiment, in order to reduce the amount of light emitted from the light emitting unit 35, the light emission time per round is reduced in the second light emission mode. In the third light emission mode, the light emission in the fourth phase P4 is stopped to reduce the number of times of light emission. In the fourth light emission mode, the waveform of the emitted light changes to triangle wave to reduce the light emission intensity. However, the configuration to reduce the amount of light emitted from the light emitting unit 35 is not limited to these configurations. For example, the light emitting unit 35 may be configured to emit light with a square wave having a uniformly reduced light emission intensity.

A reference period during which the light emission is stopped only in one of the second phase P2 and the fourth phase P4 and a reference period during which the light emission is stopped in both phases may be alternately repeated, thus providing a light emission mode in which the amount of emitted light is lower than in the third light emission mode. Similarly, a reference period during which the light emission is stopped only in one of the second phase P2 and the fourth phase P4 and a reference period during which the light emission is performed in both phases may be alternately repeated, thus providing a light emission mode in which the amount of emitted light is lower than in the second light emission mode but higher than in the third light emission mode.

In order to reduce the amount of light emitted from the light emitting unit 35 in a predetermined period, a light emission mode in which the light emitting unit 35 has a longer light emission cycle may be provided, and the time during which the light emitting unit does not emit light may be thus made longer. However, in this case, the image pickup cycle of the image pickup unit 15 of the projector 1 needs to be longer in accordance with the light emission cycle of the light emitting unit 35. It is desirable that these cycles are changed at the same timing. Therefore, in this configuration, the light pen 3 needs to notify the projector 1 of the timing of changing the light emission mode (light emission cycle). For example, the control unit 30 of the light pen 3 can notify the projector 1 of the timing of cycle change, based on whether light is emitted in a predetermined phase or not, or based on the light emission sequence in a predetermined phase over a plurality of reference periods. Specifically, in a light emission mode in which the light emitting unit 35 emits light in the fourth phase P4 without exception, the control unit 30 stops the light emitting unit 35 from emitting light in the fourth phase P4 over a predetermined number of reference periods before changing the light emission cycle, and then extends the light emission cycle from the subsequent reference period. If a predetermined number of reference periods during which the light emitting unit 35 does not emit light in the fourth phase P4 continue, the control unit 10 of the projector 1 extends the image pickup cycle from the subsequent reference period and thus can synchronize the timings of these cycle changes. The phase in which the projector is notified of the timing of cycle change is not limited to the fourth phase P4 and may be the second phase P2. Also, the first phase P1, which is a synchronous phase, may be used. In this example, the light emitting unit 35 is equivalent to a notification unit which notifies the projector 1 of the timing when the light emission mode is changed. The notification unit is not limited to the light emitting unit 35. For example, a wireless communication unit may be used.

In the embodiment, when the light emission mode is changed from the first light emission mode to the second light emission mode and when the light emission mode is changed from the third light emission mode to the fourth light emission mode, the amount of light emitted from the light emitting unit 35 during one image pickup period Tc is reduced and therefore the detection unit 25 tends to failure to detect the light. Thus, the threshold for the detection unit 25 to detect the light emitted from the light emitting unit 35 may be changed in accordance with the change in the light emission mode. Specifically, the control unit 10 of the projector 1 lowers the threshold for detection according to the reduction in the amount of light emitted from the light emitting unit 35. In this configuration, as the threshold is lowered, detection errors are more likely to occur due to the influence of noise, but the failure to detect the light due to the reduction in the amount of emitted light can be restrained. In this case, too, by notifying the projector 1 of the timing of changing the light emission mode by a method similar to the above, it is possible to synchronize the timing when the projector 1 changes the threshold with the timing when the light pen 3 changes the light emission mode.

In the embodiment, as the remaining battery capacity becomes lower, the control unit 30 applies the reduction in the light emission time, the reduction in the number of times of light emission, and the change in the waveform, in combination of each other. However, the control unit 30 may carry out each of these independently. For example, in the third light emission mode, the control unit 30 may set a light emission time of 120 microseconds in the second phase P2 and the third phase P3 and then stop the light emission in the fourth phase P4. Also, in the fourth light emission mode, the control unit 30 may set a light emission time of 120 microseconds in each phase without stopping the light emission in the fourth phase P4 and then perform light emission with a triangle wave.

In the embodiment, the reporting unit 39 reports the light emission mode of the light pen 3 via light emission by a light source such as a LED. However, the reporting is not limited to this configuration. For example, the light pen 3 may be provided with a display device such as a liquid crystal display device, organic EL (electroluminescence) display device, or electrophoretic display device, and a message or image may be displayed on this display device to report the light emission mode. Also, a sound may be outputted from an audio output unit, not illustrated, to report the light emission mode.

In the embodiment, the transmission-type liquid crystal light valves 22R, 22G, 22B are used as light modulation devices. However, a reflection-type light modulation device such as a reflection-type liquid crystal light valve can be used. Also, a digital mirror device or the like which controls the exit direction of incident light for each micromirror as a pixel so as to modulate light emitted from the light source 21 may be used. Moreover, the configuration having a plurality of light modulation devices corresponding to individual color light components is not limiting. A single light modulation device may be used to modulate a plurality of color light components in time division.

Contents derived from the embodiment will be described below.

A pointing element which performs pointing on an image projected from a projector includes: a battery; a light emitting unit which intermittently emits light with electric power supplied from the battery; a remaining battery capacity detection unit which detects a remaining capacity of the battery; and a control unit which changes a light emission form of the light emitting unit in such a way as to reduce an amount of light emitted from the light emitting unit, if the remaining capacity of the battery detected by the remaining battery capacity detection unit is equal to or lower than a predetermined threshold.

In this configuration, the control unit changes the light emission form of the light emitting unit and reduces the amount of light emitted from the light emitting unit, if the remaining capacity of the battery drops and becomes equal to or lower than the threshold. Thus, the depletion of the battery is restrained and the time during which the pointing element can be used can be extended.

In the pointing element, it is desirable that the control unit reduces a light emission time of the light emitting unit in a predetermined period, if the remaining capacity of the battery detected by the remaining battery capacity detection unit is equal to or lower than the predetermined threshold.

In the configuration, the control unit reduces the light emission time of the light emitting unit in the predetermined period. Thus, the amount of light emitted from the light emitting unit can be reduced by the amount of reduction in the light emission time.

In the pointing element, it is desirable that the control unit reduces a number of times the light emitting unit emits light in a predetermined period, if the remaining capacity of the battery detected by the remaining battery capacity detection unit is equal to or lower than the predetermined threshold.

In this configuration, the control unit reduces the number of times the light emitting unit emits light in the predetermined period. Thus, the amount of light emitted from the light emitting unit can be reduced by the amount of reduction in the number of times of light emission.

In the pointing element, it is desirable that the control unit reduces a light emission intensity of the light emitting unit, if the remaining capacity of the battery detected by the remaining battery capacity detection unit is equal to or lower than the predetermined threshold.

In this configuration, the control unit reduces the light emission intensity of the light emitting unit. Thus, the amount of light emitted from the light emitting unit can be reduced by the amount of reduction in the light emission intensity.

It is desirable that the pointing element further includes a reporting unit which reports that the light emission form of the light emitting unit is changed, if that happens.

In this configuration, the pointing element has the reporting unit. Thus, it is possible to report to the user that the light emission form is changed.

It is desirable that the pointing element further includes a notification unit which notifies the projector of a timing of changing the light emission form of the light emitting unit.

In this configuration, the pointing element has the notification unit, which notifies the projector of the timing of changing the light emission form. Thus, the projector can operate according to the change in the light emission form of the pointing element.

An image projection system includes a projector and a pointing element which performs pointing on an image projected from the projector. The pointing element includes: a battery; a light emitting unit which intermittently emits light with electric power supplied from the battery; a remaining battery capacity detection unit which detects a remaining capacity of the battery; and a control unit which changes a light emission form of the light emitting unit in such a way as to reduce an amount of light emitted from the light emitting unit, if the remaining capacity of the battery detected by the remaining battery capacity detection unit is equal to or lower than a predetermined threshold.

In this configuration, the pointing element changes the light emission form of the light emitting unit and reduces the amount of light emitted from the light emitting unit, if the remaining capacity of the battery drops and becomes equal to or lower than the threshold. Thus, the depletion of the battery is restrained and the time during which the pointing element can be used can be extended.

A method for controlling a pointing element is for a pointing element which has a battery and a light emitting unit and which performs pointing on an image projected from a projector. The method includes: causing the light emitting unit to intermittently emit light with electric power supplied from the battery; detecting a remaining capacity of the battery; and changing a light emission form of the light emitting unit in such a way as to reduce an amount of light emitted from the light emitting unit, if the detected remaining capacity of the battery is equal to or lower than a predetermined threshold.

In this configuration, the light emission form of the light emitting unit is changed to reduce the amount of light emitted from the light emitting unit, if the remaining capacity of the battery drops and becomes equal to or lower than the threshold. Thus, the depletion of the battery is restrained and the time during which the pointing element can be used can be extended.

The entire disclosure of Japanese Patent Application No. 2018-057645, filed Mar. 26, 2018 is expressly incorporated by reference herein.

What is claimed is:

1. A pointing element which performs pointing on an image projected from a projector, the pointing element comprising:
   a battery;
   a light emitter which intermittently emits light with electric power supplied from the battery, the emitted light containing pointing information and being configured to be detected by a projector; and
   a processor configured to:
      detect a remaining capacity of the battery;
      determine whether the detected remaining capacity of the battery is equal to or lower than a first threshold;
      when the detected remaining capacity of the battery is equal to or lower than the first threshold, change a light emission form of the light emitter to reduce an amount of light emitted by operating the light emitter in a first mode in which a length of a light emission period is reduced compared to a normal operating mode;
      determine whether the detected remaining capacity of the battery is equal to or lower than a second threshold lower than the first threshold; and
      when the detected remaining capacity of the battery is equal to or lower than the second threshold, change the light emission form of the light emitter to reduce the amount of light emitted by operating the light emitter in a second mode in which the length and a frequency of the light emission period are reduced compared to the normal operating mode.

2. The pointing element according to claim 1, wherein the processor is configured to:
   determine whether the detected remaining capacity of the battery is equal to or lower than a third threshold lower than the second threshold; and
   when the detected remaining capacity of the battery is equal to or lower than the third threshold, change the light emission form of the light emitter to reduce the amount of light emitted by operating the light emitter in a third mode in which the length and frequency of the light emission period are reduced compared to the normal operating mode, and a light emission intensity of the light emitter is reduced compared to the normal operating mode.

3. The pointing element according to claim 2, wherein in the third mode, a waveform of the light emission intensity is a triangle wave.

4. The pointing element according to claim 2, wherein in the third mode, the light emission intensity is progressively decreased during the light emission period.

5. The pointing element according to claim 1, further comprising:
   an indicator that reports a change of the light emission form of the light emitter.

6. The pointing element according to claim 1, further comprising:
   a communicator which notifies the projector of a timing of changing the light emission form of the light emitter.

7. An image projection system comprising:
   a projector; and
   a pointing element which performs pointing on an image projected from the projector, the pointing element including:
      a battery;
      a light emitter which intermittently emits light with electric power supplied from the battery, the emitted light containing pointing information and being configured to be detected by the projector; and
      a processor configured to:
         detect a remaining capacity of the battery;
         determine whether the detected remaining capacity of the battery is equal to or lower than a first threshold;
         when the detected remaining capacity of the battery is equal to or lower than the first threshold, change a light emission form of the light emitter to reduce an amount of light emitted by operating the light emitter in a first mode in which a length of a light emission period is reduced compared to a normal operating mode;
         determine whether the detected remaining capacity of the battery is equal to or lower than a second threshold lower than the first threshold; and
         when the detected remaining capacity of the battery is equal to or lower than the second threshold, change the light emission form of the light emitter to reduce the amount of light emitted by operating the light emitter in a second mode in which the length and a frequency of the light emission period are reduced compared to the normal operating mode.

8. A method for controlling a pointing element which has a battery and a light emitter and which performs pointing on an image projected from a projector, the method comprising:
   causing the light emitter to intermittently emit light with electric power supplied from the battery, the emitted light containing pointing information and being configured to be detected by a projector;
   detecting, using a processor, a remaining capacity of the battery;
   determining, using the processor, whether the detected remaining capacity of the battery is equal to or lower than a first threshold; and
   when the detected remaining capacity of the battery is equal to or lower than the first threshold, changing, using the processor, a light emission form of the light emitter to reduce an amount of light emitted by operating the light emitter in a first mode in which a length of a light emission period is reduced compared to a normal operating mode;
   determining, using the processor, whether the detected remaining capacity of the battery is equal to or lower than a second threshold lower than the first threshold; and
   when the detected remaining capacity of the battery is equal to or lower than the second threshold, changing, using the processor, the light emission form of the light emitter to reduce the amount of light emitted by operating the light emitter in a second mode in which the length and a frequency of the light emission period are reduced compared to the normal operating mode.

9. The method for controlling the pointing element according to claim 8, further comprising:
   determining, using the processor, whether the detected remaining capacity of the battery is equal to or lower than a third threshold lower than the second threshold; and
   when the detected remaining capacity of the battery is equal to or lower than the third threshold, changing, using the processor, the light emission form of the light emitter to reduce the amount of light emitted by operating the light emitter in a third mode in which the length and frequency of the light emission period are reduced compared to the normal operating mode, and a light emission intensity of the light emitter is reduced compared to the normal operating mode.

10. The method for controlling the pointing element according to claim 9, wherein in the third mode, a waveform of the light emission intensity is a triangle wave.

11. The method for controlling the pointing element according to claim 9, wherein in the third mode, the light emission intensity is progressively decreased during the light emission period.

12. The method for controlling the pointing element according to claim 8, wherein it is reported when the light emission form of the light emitter is changed.

13. The method for controlling the pointing element according to claim 8, wherein the projector is notified of a timing of changing the light emission form of the light emitter.

* * * * *